United States Patent [19]

Kemner

[11] 4,324,276
[45] Apr. 13, 1982

[54] NOISE DAMPING DEVICE
[75] Inventor: Ulrich Kemner, Sachsenheim, Fed. Rep. of Germany
[73] Assignee: Robert Bosch GmbH, Stuttgart, Fed. Rep. of Germany
[21] Appl. No.: 42,260
[22] Filed: May 24, 1979
[30] Foreign Application Priority Data
Jul. 22, 1978 [DE] Fed. Rep. of Germany ....... 2832299
[51] Int. Cl.³ .................. F16L 55/04; F16K 15/00
[52] U.S. Cl. .................................. 138/30; 137/536; 137/568
[58] Field of Search ............... 138/30, 42; 137/529, 137/536, 568, 593

[56] References Cited
U.S. PATENT DOCUMENTS

| 2,233,804 | 3/1941 | Bourne | 138/30 |
| 2,341,556 | 2/1944 | Joy | 138/30 |
| 2,544,289 | 3/1951 | Andrews | 138/30 |
| 2,847,035 | 8/1958 | Peters | 138/30 |
| 3,621,882 | 11/1971 | Kupiec | 138/30 |
| 3,719,595 | 3/1973 | Johnson | 138/26 |
| 3,744,527 | 7/1973 | Mercier | 138/30 |
| 3,766,992 | 10/1973 | Tiraspolsky et al. | 138/30 |
| 3,794,078 | 2/1974 | Mercier | 138/30 |
| 3,913,613 | 10/1975 | Kostjunon | 137/529 |
| 4,079,750 | 0/1978 | Ludwig | 138/42 |

Primary Examiner—Steven L. Stephan
Attorney, Agent, or Firm—Edwin E. Greigg

[57] ABSTRACT

A noise damping device is proposed for the reduction and smoothing out of compressional vibrations of a conveying medium, especially fuel conveyed by fuel feed pumps, which device serves for diminishing the continuous pressure vibrations by means of suitable damping installations in the fuel circulation. The noise damping device comprises arrangements comprising locations of discontinuity, cross-sectional changes, changes in the flow path as well as including at least one wall section which yields in an elastically resilient manner, whereby a simultaneous dynamic volume change is likewise produced. Such pressure vibration damping devices can be arranged at any desired point in the fuel circulation, preferably in the zone of the pressure connection of the fuel feed pump, and can have the form of barometric bellows, accordion bellows, corrugated hoses, and the like.

4 Claims, 7 Drawing Figures

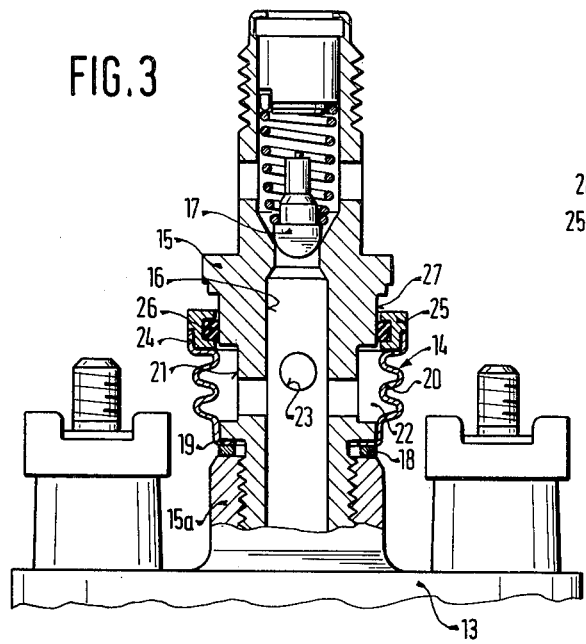
FIG.3
FIG.3a
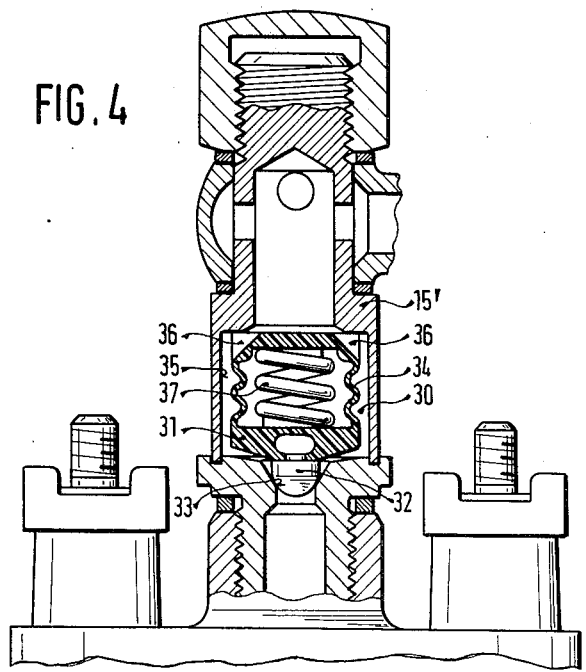
FIG.4
FIG.4a

NOISE DAMPING DEVICE

BACKGROUND OF THE INVENTION

The invention relates to a noise damping device for smoothing out and reducing pressure vibrations which occur in automobile fuel feed pumps. It has been proposed heretofore to arrange, for noise damping purposes, devices having an elastic volume within the housing of a fuel feed pump wherein this pump temporarily changes its inside volume, in case of pressure fluctuations, for damping purposes. The formation of pressure vibrations and thus the noise production when conveying a fluid such as fuel that is fed to the internal combustion engine with the aid of a fluid pump is due to the fact that this pump is designed as a piston pump or a pump of related type, e.g., a displacement pump. Such pumps take in the medium to be conveyed, compress it, and discharge it again, with this procedure being repeated cyclically in extremely quick succession. In a roller cell pump as the displacement pump, frequently utilized in fuel feeding, the intake, compression, and discharge procedure of the medium is repeated as often as mutually sealed-off chamber volumes are available, i.e., in case of a five-cell roller cell pump five times. Each of these pumping steps is connected with a short-term drop in the suction vacuum and a rise in the conveying pressure, accordingly the frequency of the thus-produced pressure vibrations is determined from the pump speed of revolution. Therefore, in various vehicles, if the fluid pumps to be damped are fuel feed pumps, noise can also penetrate into the passenger compartment and can be, in part, troublesome, particularly since these noises are due to the pressure fluctuations in the fuel feed system caused by the aforedescribed pump system, which noises are propagated in the form of air-transmitted sound stemming from sound conducted through the material from which the pressure lines are made as well as throughout the automobile car body. A reduction of such pressure vibrations at the site of origin is hardly possible. Consequently, the present invention is directed toward reducing and/or entirely eliminating any disturbing noise by the specific arrangement and construction of damping installations in the fuel circulation system.

OBJECT AND SUMMARY OF THE INVENTION

The noise damping device of this invention for pressure vibrations in a conveying medium, as described herein and finally claimed, has the advantage over the above-described prior art that it is unnecessary to directly interfere with the pumping area, yet a damping of the noise is possible in the directly adjacent zone, since the pressure connection of the fuel feed pump is designed in accordance with this invention to provide noise damping.

Another advantage is also the compact mode of construction of the damping elements which can be made integral parts of connecting means which are required for the pump installation.

By the measures set forth in the dependent claims, further advantageous developments and improvements are possible in the noise damping device as broadly indicated in the main claim. It is especially advantageous that such a noise damping device can be arranged in the route of the fuel circulation system, forming parts of this system which counteract the formation of pressure vibrations in a smoothing and damping capacity.

The invention will be better understood as well as further objects and advantages thereof become more apparent from the ensuing detailed description of the preferred embodiments taken in conjection with the drawings.

BRIEF DESCRIPTION OF THE DRAWINGS

FIG. 3 shows, in cross-section, a third embodiment of a pressure vibration damper disposed in the outlet zone or pressure connection of a fuel feed pump;

FIG. 3a schematically shows in a detail an advantageous construction of the pressure vibration damper of FIG. 3; and FIGS. 4 and 4a show in cross-section a fourth embodiment of a pressure vibration damper integrated into the pressure connection.

DESCRIPTION OF THE EMBODIMENTS

The basic aspect of the present invention resides in effecting the damping of pressure vibrations in fluids by reflection of the pressure wave on locations of discontinuity in the conveying stream. Such locations of discontinuity can be constituted by changes in cross section, changes in the flow direction, or by elastic volume changes in the closed cycle. While a medium flows through an elastic body, simultaneously effecting a widening in cross section, along the route of the fuel line, a pressure increase occurs due to this widening of the cross section which, in conjunction with the pressure peaks caused by the pressure vibrations, leads to an increase in volume, for the body is elastic at least in partial zones of its wall. As a consequence, the pressure wave is reflected and energy of the pressure vibration is dissipated due to frictional losses of various kinds.

Figure 1:
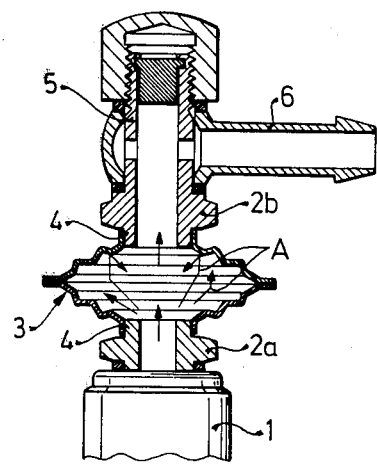
FIG. 1 shows, in cross-sectional view, a first embodiment of a pressure vibration damper in the outlet zone of a fuel feed pump.

Turning now to the drawings in the embodiment shown in FIG. 1, a pressure damping device is connected between the pressure connection, denoted by 1, of a fluid pump, not shown, e.g, a fuel feed pump, and interposed fittings or adjusting pieces 2a and 2b. This pressure damping device is located in the direct fuel circulation line and forms at least one location of discontinuity in the conveying stream. Among these are a widening in cross section and besides the ability of the pressure vibration damper, denoted by 3, to enlarge its volume under the effect of pressure peaks, i.e. , to react in an elastically resilient manner with a volume change to pressure vibrations. The pressure vibration damper illustrated has the shape of a barometric bellows, or also of an accordion bellows, and, in the illustrated embodiment of FIG. 1, also actually consists of a barometric bellows which is welded or soldered on its opposite extremities to collars 4 provided on each fitting 2a, 2b. As viewed in the drawing, the upper fitting 2b is attached to a final connecting pipe 5 which has a check valve, not shown. The connecting pipe in this embodiment is affixed to a connecting nipple 6 at a right angle to the pipe 5. In this manner a fuel hose can be placed thereon. As is known, such a barometric bellows or accordion bellows (likewise made of a correspondingly resilient, yielding metal or metallic composite material) consists at least in part of wall zones which are elastically resilient and which effect a change in volume in case of a pressure change which, in this case, would take place internally. While the medium flows through this elastic body (see the small flow arrows A), a pressure rise is produced in the barometric bellows due to a cross-sectional enlargement (reduction in flow) and, in conjunction with the pressure vibrations or pressure peaks to be reduced, cyclic volume changes are incurred, which lead to the breakdown of pressure waves due to reflection as well as to an energy dissipation due to frictional losses. The barometric bellows creates a discontinuity in the conveying stream and effectively damps pressure vibrations in general to such an extent that the noise evolution is markedly reduced and/or eliminated to such a degree that it is no longer annoying or troublesome. The flow deflection caused by the barometric bellows can be enhanced in accordance with the structure in FIG. 1a by arranging approximately in the center thereof a separating wall or partition 7, which has passage openings 8 arranged in a manner offset from the center for the flow medium, so that after a first deflection against the partition and after passage through the openings 8 a second deflection occurs on the wall 9 of the barometric bellows, which wall narrows inwardly, as shown. By this effective flow deflection, the efficiency of the location of discontinuity caused by the barometric bellows or an accordion bellows hose at this point is even further enhanced.

Figure 1A:
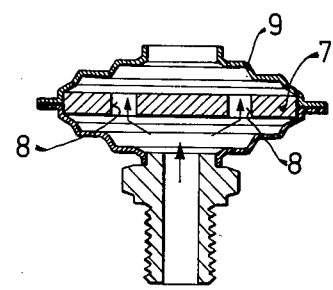
FIG. 1a shows, in cross-section, another development of the system shown in FIG. 1 with fuel flow deflection.
Figure 2:
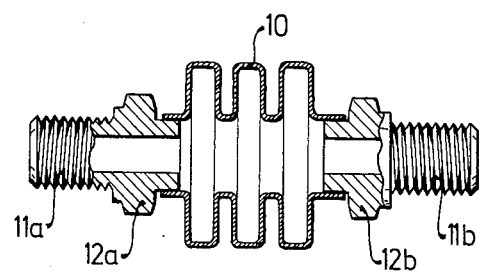
FIG. 2 shows, in cross-section, a second embodiment of a pressure vibration damper which can be installed as an integral component of a fuel line.

In conjunction with such a pressure vibration damper as illustrated in FIGS. 1 and 1a, or also separately by itself, it is possible to use the flexible corrugated hose or metal accordion bellows 10 illustrated in FIG. 2, which can be installed in a convenient manner in the fuel line denoted by 11a and 11b by way of two bilateral fittings 12a and 12b. By means of such a flexible hose section installed in the pressure line, considerable discontinuity effects are produced, because repeated flaring and tapering cross sections such as those produced by the structure of FIG. 2, are provided with fluctuating flow velocities, with reflections, and, in conjunction therewith, elastic volume changes in the closed cycle, for the corrugated hose 10 reacts to pressure peaks with widening of its internal volume and also compensates for a pressure reduction, so that in total a smoothing of the pressure vibration curve is consequently attained.

FIG. 3 shows a further embodiment of a pressure vibration damper 14 arranged in the zone of the outlet connection or pressure connection 1 of a fuel feed pump indicated schematically by 13. The pressure connection 1 is bipartite and comprises an insert part 15 of approximately cylindrical shape with a central passage or bore 16 for the fuel conveyed therein, this bore terminates in the zone of a check valve 17, from which the fuel is then conducted away in the usual manner, but this is not illustrated in detail. The section 15 is inserted in an annular flange 15a which extends from the pump housing and is seated therein, for example, either by threading or in a press-fit. During assembly with the fuel feed pump, the edge zone 19 of a corrugated hose, an accordian bellows, or a similar system which is capable of producing zones of discontinuity by alternating cross-sectional widening and narrowing in conjunction with a resilient wall, is clamped in place and sealingly attached peripherally simultaneously and with the interposition of a sealing ring 18. Therefore, in the zone of the pressure vibration damper 14, an external wall results, formed by the accordion bellows 20, as it will be called herinafter, as well as an internal wall, formed by a cross-sectional reduction 21 of the pressure connection part 15. The fuel passes into the pressure vibration damping chamber 22 between the wall of the accordion bellows 20 and the reduced area 21 via a bore 23. The effect of the pressure vibration damper 14 arranged at this point and comprising the accordion bellows 20 is the same as in the examples described hereinabove, wherein, in this further advantageous embodiment, in order to improve the volume-changing feature, the upper rim 24 of the accordion bellows 20 can be connected pressure-tight with an annular ring 25, for example by soldering or welding, this ring, in turn, being vertically displaceably in contact with a shoulder 27 of the outlet end of connection piece 15 by way of a gasket or O-ring 26.

In a further particularly advantageous embodiment, it is also possible as shown in FIG. 3a to arrange an auxiliary spring element 29 such as a Belleville spring element for regulating and controlling the vertical displacement of the ring 25 and thus the volume change between the ring 25 and an upper stop, formed by a shoulder 28, whereby the change in volume can be specifically controlled. In this connection, it is advantageous to provide an auxiliary plate spring with a degressive characteristic, whereby a large volume change is made possible for the operating pressure range with a relatively minor change in force. The feature of sealing this system, based on an accordion bellows, by means of an O-ring is readily feasible and can be executed flawlessly.

Another, especially preferred embodiment can be seen from FIGS. 4 and 4a, showing a possibility of combining the pressure damper and the check valve, wherein furthermore no additional sealing zone toward the outside is required. In the embodiment of FIG. 4, a capsule 31 is disposed within a larger cylindrical cavity 30 in the upper section 15' of the pressure connection of the fuel feed pump. This capsule has the external wall shape of an accordion bellows but is sealed off pressure-tight toward the interior. Thus, this capsule has approximately the effect of a pneumatic spring and has at its lower end a valve member 32 which is urged into contact with a seat 33. In this manner the usual check valve in the pressure connection is realized, but at the same time at least one zone of discontinuity is obtained in the conveying stream for purposes of the pressure vibration damping action, namely in this case by the undulatory outer wall 34 of the capsule in conjunction with the cylindrical inner wall 35 of the cavity 30. The fuel supply, which is under the conveying pressure, enters the cavity 30 via the check valve, then experiences in this cavity a reflection/deflection and smoothing by the variable volume of the capsule which, by itself, forms a type of pneumatic spring, and then flows past beveled edge zones 36 upwardly to the customary connection nipple. A helical spring 37 is arranged within the pressure-tight capsule so that the volume change for the operating pressure range can be correspondingly adjusted by a varying design of the springs and their characteristics, referred to in the embodiment of FIG. 3a.

In the embodiment of FIG. 4a, an auxiliary spring 38 is provided which rests on the top of the capsule 31, with the upper terminus of this spring being in abutment against a transverse wall portion 39 of the upper connection section 15' and thus sealed off in a pressure-tight manner, so that the operation of the check valve is further improved.

What is claimed and desired to be secured by Letters Patent of the United States is:

1. A noise damping device for smoothing out and reducing pressure vibrations which occur in automobile fuel feed pumps including a fuel pressure line extending from said fuel feed pump to a carburetor of an automobile engine which comprises: a pressure connection piece connected to said fuel feed pump; a pressure chamber formed in said pressure connection piece, an inlet into said pressure chamber; a sealed, pressurized, yieldable unitary capsule in said pressure chamber; a helical spring element contained in said unitary capsule; and a valve means secured onto said unitary capsule which opens and closes said inlet to said pressure chamber for fuel flow from said fuel pressure line into said pressure chamber.

2. Noise damping device according to claim 1, further wherein said chamber communicates with an enlarged conduit area and a spring element is disposed in said area.

3. A noise damping device for smoothing out and reducing pressure vibrations which occur in automobile fuel feed pumps including a fuel pressure line extending from said fuel feed pump to a carburetor of an automobile engine, which comprises: a pressure connection piece connected to said fuel feed pump; a pressure chamber formed by an elastically resiliently yielding wall portion having upper and lower ends surrounding a portion of said pressure connection piece; a fuel inlet connected with said pressure connection piece; said yielding wall portion comprising an annulus having an undulatory surface with the lower end of said yielding wall portion fixed in place on the outside of said pressure connection piece, a mounting ring secured to the upper end of said yielding wall portion and mounted on the outside of said pressure connection piece; said mounting ring being slidable relative to said pressure connection piece and said pressure connection piece including aperatures which permit full flow into said pressure chamber from said fuel inlet.

4. Noise damping device according to claim 3, further wherein said pressure connection piece includes an offstanding portion in proximity to said displaceable ring and an auxiliary spring element disposed between said offstanding portion and said displaceable ring, whereby a large change in volume with relatively small change in force is permitted.

* * * * *